United States Patent [19]

Schlichting et al.

[11] 3,935,161

[45] Jan. 27, 1976

[54] PROCESS FOR STABILIZING POLYAMIDES

[75] Inventors: Karl Schlichting, Bobenheim-Roxheim; Peter Horn; Johannes Schlag, both of Ludwigshafen; Wolfgang Koernig, Mannheim, all of Germany

[73] Assignee: BASF Aktiengesellschaft, Ludwigshafen, Germany

[22] Filed: Sept. 11, 1974

[21] Appl. No.: 504,873

Related U.S. Application Data

[62] Division of Ser. No. 444,414, Feb. 21, 1974.

[30] Foreign Application Priority Data

Feb. 24, 1973 Germany............................ 2309435

[52] U.S. Cl..................... 260/45.9 NC; 260/45.9 R
[51] Int. Cl.²......................................... C08G 6/00
[58] Field of Search ............... 260/45.9 NC, 45.9 R

[56] References Cited
UNITED STATES PATENTS
3,780,103    12/1973    Knell................................ 260/45.9

*Primary Examiner*—V. P. Hoke
*Attorney, Agent, or Firm*—Johnston, Keil, Thompson & Shurtleff

[57] ABSTRACT

Suitable compounds for stabilizing polyamides against oxidation and thermal degradation are bis-ureas and bis(acid amides) based on 2,6-di-t-butylphenol-butylamine said compounds having the general formula:

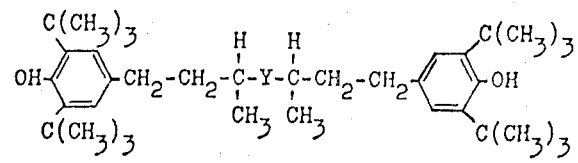

wherein Y represents the urea or amide radical.

10 Claims, No Drawings

PROCESS FOR STABILIZING POLYAMIDES

RELATED APPLICATION

This application is a division of our copending application Ser. No. 444,414, filed Feb. 21, 1974.

This invention relates to a process for stabilizing polyamides against oxidation and thermal degradation.

It is known to stabilize polyamides against the action of heat and air by adding, say, phosphites, complex copper/alkali metal halide compositions, phenolic compounds or aromatic amines.

None of these stabilizers gives perfectly satisfactory results when incorporated in polyamides.

For example, copper salt/halide system lose their stabilizing activity completely in the presence of certain pigments such as cadmium pigments or SACHTOLITH (registered trade mark). Other stabilizers, for example the p-phenylene diamine derivatives cause discoloration and are physiologically unsatisfactory. Stabilizers based on kryptophenol are either too volatile for incorporation into the polyamide melt, as in the case of 2.6-di-t-butylphenol for example, or they become discolored, as in the case of 2,2'-methylene-bis-(4-methyl-6-t-butylphenol) for example, or they have an inadequate stabilizing action, as for example 1,3,5-trimethyl-2,4,6-tri-(3',5'-di-t-butyl-4'-hydroxybenzyl)-benzene and the β-(3,5,-di-t-butyl-4-hydroxyphenyl)-propionate of pentaerythritol.

We have now found that, surprisingly, an improvement in the stabilizing action is achieved, without discoloration of the polyamide matrix, particularly in the presence of pigments, if the stabilizers used are compounds of the general formula

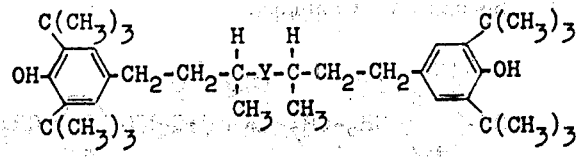

In the formula, the symbol Y has the following meanings:

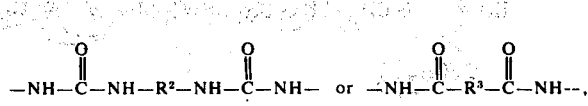

where $R^2$ is a residual radical derived from aliphatic, aromatic or aromatic-aliphatic diisocyanates and

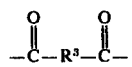

is the acyl radical of an aliphatic or aromatic dicarboxylic acid.

Depending on the meanings of the radical Y, the compounds to be used in the present invention may be divided into the following groups:

bis-ureas

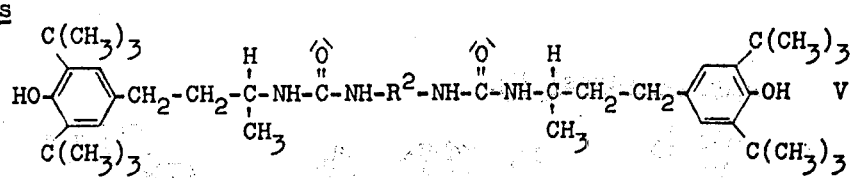

bis(acid amides)

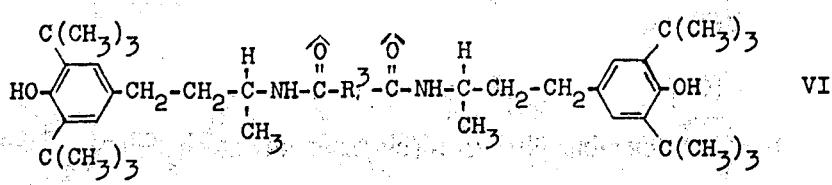

Specific examples of the various compounds suitable for stabilizing polyamides according to the present invention are:

bis-ureas V

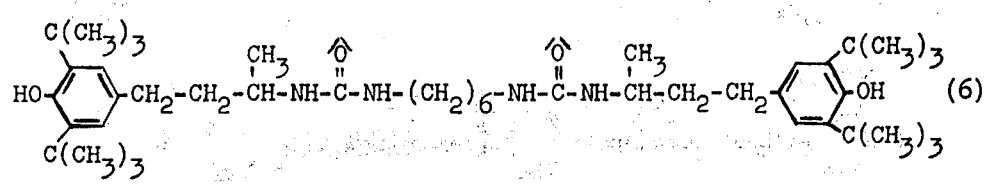

bis-ureas V—Continued
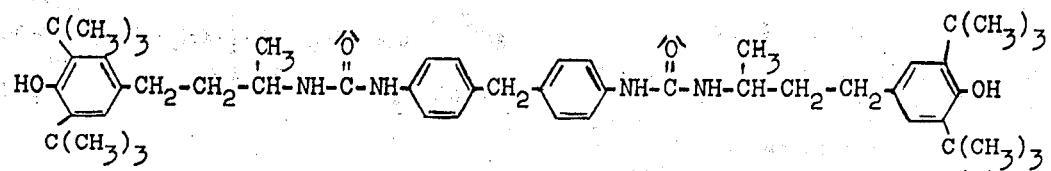
(7)
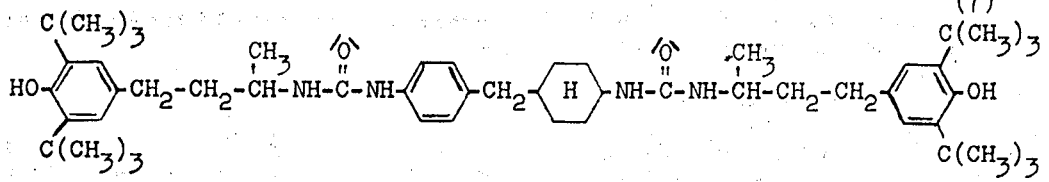
(8)
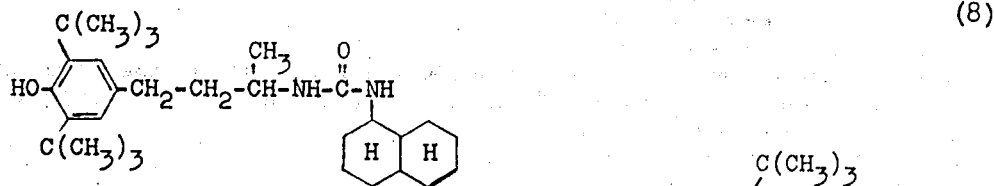
(9)
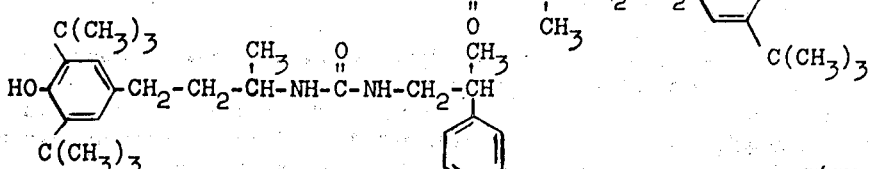
(10)
bis(acid amides) VI
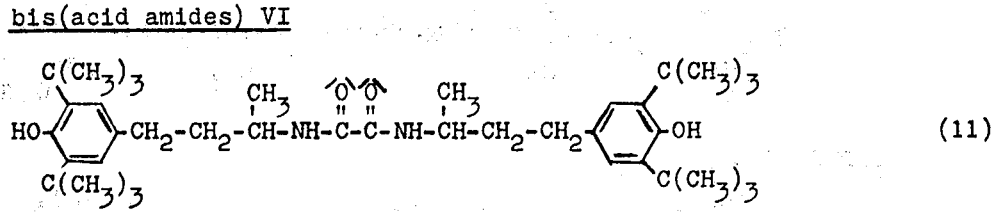
(11)
(12)
(13)
(14)

bis (acid amides) VI — Continued

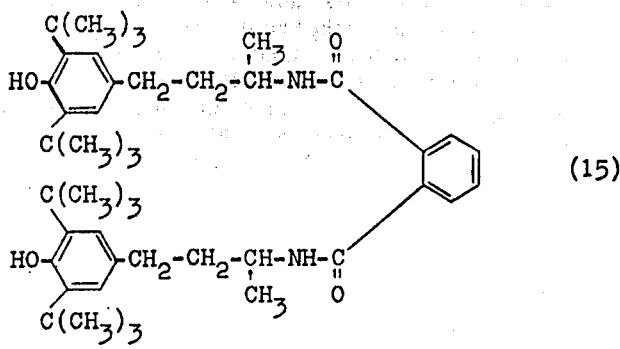

(15)

The compounds to be used in the invention are derived from 2,6-di-t-butylphenyl-butylamine, The compounds to be used in the present invention may be prepared by methods known in the art to which no claim is made herein, for example according to the following scheme:

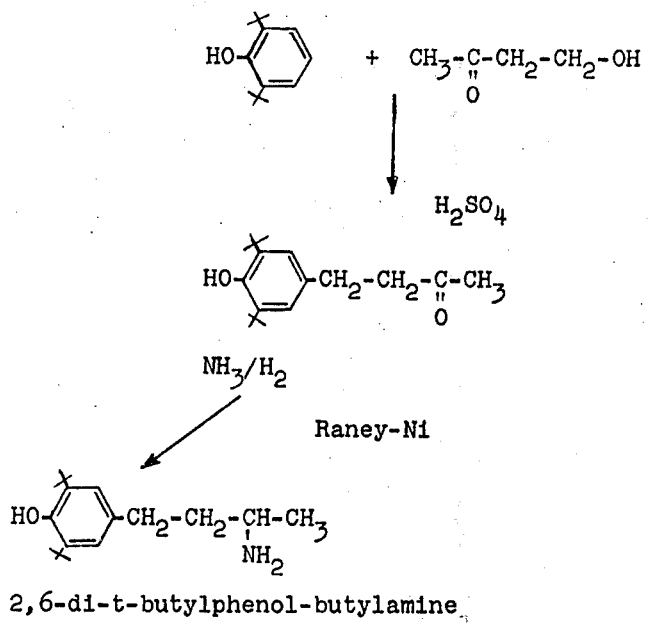

2,6-di-t-butylphenol-butylamine

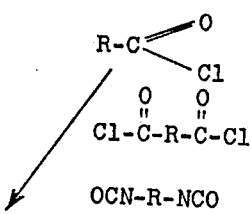

bis(acid amides) VI
bis-ureas V

The amount of stabilizer used is usually from 0.01 to 2% and preferably from 0.1 to 1%, by weight of solid polymer. The stabilizer may be added to the polyamide-forming monomers prior to polymerization or to the mixture during polymerization, or they may be incorporated into the finished polyamide after polymerization. Suitable processes are those usually employed for this purpose, as described for example in Kunststoff-Handbuch, Vol. VI, Polyamide, Edited by R. Vieweg and A. Muller, published by Karl Hanser Verlag, Munich, 1966. The stabilizing action extends over all polyamides and copolyamides and polyamide mixtures produced from the well-known polyamide-forming compounds such as lactams, diamines and dicarboxylic acids and aminocarboxylic acids. Examples of polyamide-forming lactams are pyrrolidone, caprolactam, capryllactam, enantholactam, aminoundecanolactam and lauroyllactam, which may be polymerized by cationic mechanisms either alone or in admixture with each other. Polycondensates of diamines and dicarboxylic acids are for example those producible from aliphatic dicarboxylic acids of from 4 to 18 carbon atoms and diamines of from 4 to 18 carbon atoms, particularly nylon 6,6 and nylon 6,10. There are obtained polyamides which are free from discoloration and which show greatly improved stability of their properties over the use of conventional phenolic stabilizers even when subjected to high thermal stresses and strong oxidizing attacks. The stabilizing action applies both to polyamides intended for the manufacture of shaped articles and to those intended for the preparation of fibers and filaments. The stabilizers of the invention are particularly suitable for use in colored polyamides, since the color values are not impaired thereby. This is particularly applicable to polyamides containing pigments. It is of no detriment when the polyamides also contain conventional fillers, e.g.

glass fibers, other polymers, lubricants, crystallization accelerators and other conventional additives and other stabilizers.

The following Examples illustrate the above method of polyamide stabilization and the activity of the stabilizers used. The parts are by weight. The percentages are by weight, based on the polymer product stabilized. The characteristic mechanical property taken as a measure of the aging properties (thermal resistance) was the perforated notched impact resistance, which was measured on standard specimens according to German Standard DIN 53,453. A hole having a diameter of 3 mm was drilled in the center of the said specimens measuring 4 × 6 × 50 mm and the specimens were stored in air for 30 days at 140°C. Tests were carried out after 3, 10, 20 and 30 days, each test consisting of the determination of the perforated notched impact resistance on ten specimens, as described in "Kunststoffe" 57 (1967), pp. 825 to 828.

EXAMPLE 1

200 parts of polycaprolactam granules having a K value of 72 (1% in conc. sulfuric acid) are mechanically mixed with 1 part of the stabilizer compound listed in Table 1, and the mixture is melted in a twin-shaft kneader at 270°C and extruded, the residence time of the mixture in the kneader being 5 minutes. The extrudate is granulated, dried and converted to standard specimens according to DIN 53,453 by injection molding. The molecular weight corresponds to that of the starting polycaprolactam within the limits of error. The color of the specimens was assessed visually and the perforated notched impact resistance was determined. The results are listed in Table 1 below.

EXAMPLE 2

Example 1 is repeated using 200 parts of polycaprolactam granules having a K value of 72 and 1 part each of the stabilizer compound and pigment listed in Table 2 below. The results are listed in Table 2.

EXAMPLE 3

Example 2 is repeated using 200 parts of polyhexamethylene adipamide granules having a K value of 72 (1% w/w in conc. $H_2SO_4$) in place of polycaprolactam granules. The results are listed in Table 3 below.

TABLE 1

| Stabilizer | Color | Impact resistance (notched, perforated) ($cmkg/cm^2$) after | | | | |
|---|---|---|---|---|---|---|
| | | 0 | 3 | 10 | 20 | 30 days |
| none | colorless | 60 | 1.9 | 1.0 | 0.9 | 0.9 |
| 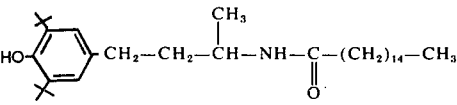 | as starting polyamide | 61.5 | 43.7 | 30.8 | 8.5 | 1.8 |
| 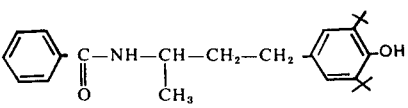 | " | 73.7 | 74.0 | 30.0 | 2.7 | 1.8 |
| 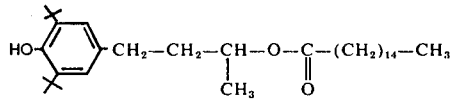 | " | 60.1 | 40.8 | 28.8 | 6.0 | 1.5 |
| 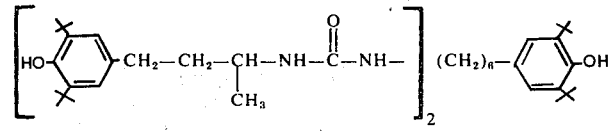 | " | 65.0 | 55.0 | 45.9 | 14.3 | 3.0 |
| 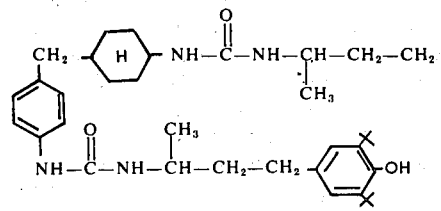 | " | 60.3 | 40.1 | 20.0 | 8.5 | 1.8 |
| 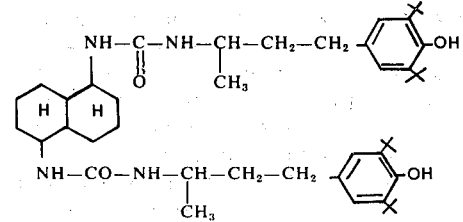 | " | 86.6 | 69.0 | 47.1 | 13.8 | 3.0 |

TABLE 1-continued

| Stabilizer | Color | Impact resistance (notched, perforated) (cmkg/cm²) after | | | | |
|---|---|---|---|---|---|---|
| | | 0 | 3 | 10 | 20 | 30 days |
| 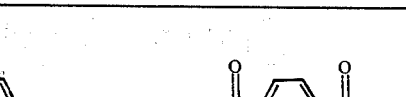 | as starting polyamide | 60.0 | 55.0 | 20.8 | 6.5 | 0.8 |
| 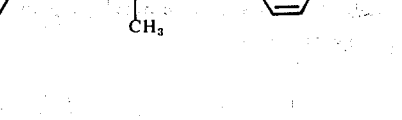 | " | 61.6 | 56.0 | 43.8 | 12.0 | 2.0 |

TABLE 2

Stabilization of pigmented nylon 6 (Example 2)

| Stabilizer | Pigment | Color | Impact resistance (notched, perforated) (cmkg/cm²) after | | | | |
|---|---|---|---|---|---|---|---|
| | | | 0 | 3 | 10 | 20 | 30 days |
| (structure above) | Cadmium yellow 6 GN | lemon yellow | 71.2 | 64.2 | 58.8 | 16.0 | 2.6 |
| " | Cadmium red BBS | cherry red | 68.0 | 53.5 | 45.8 | 10.3 | 1.8 |
| Cu complex of ethanolamine diacetic acid + KBr | Cadmium yellow 6 GN | dirty yellow | 46.6 | 1.8 | 1.1 | 0.9 | 0.8 |
| " | Cadmium red BBS | dark red | 20.2 | 3.4 | 1.1 | 0.9 | 0.9 |

TABLE 3

Stabilization of nylon 6.6 (Example 3)

| Stabilizer | Pigment | Color | Impact resistance (notched, perforated) (cmkg/cm²) after | | | | |
|---|---|---|---|---|---|---|---|
| | | | 0 | 3 | 10 | 20 | 30 days |
| none | none | pale | 68.0 | 2.2 | 1.0 | 0.8 | 0.8 |
| (structure) | none | as starting polyamide | 67 | 55 | 40 | 10.3 | 4.5 |
| Cu complex of ethanolamine diacetic acid + KBr | Sachtolith HD | pale | 67.0 | 52.3 | 38.5 | 9.8 | 2.0 |
| | none | slithtly darker than starting polyamide | 62 | 50 | 48 | 30 | 15 |
| " | Sachtolith HD | pale gray | 26.2 | 1.7 | 0.9 | 0.8 | 0.8 |

We claim:
1. A process for stabilizing polyamides against oxidation and thermal degradation, which comprises adding thereto a stabilizing compound of the formula:

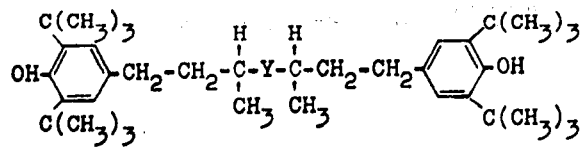

in which Y denotes

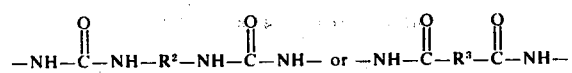

where $R^2$ is a radical derived from aliphatic, aromatic or aromatic/aliphatic diisocyanates and

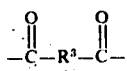

is the diacyl radical of an aliphatic or aromatic dicarboxylic acid.

2. A process as claimed in claim 1, wherein the stabilizer compound is used in amounts of from 0.01 to 2% by weight of the polyamide.

3. A process as claimed in claim 2 wherein said amount is in the range of 0.1 to 1%.

4. A process as claimed in claim 1 wherein said stabilizing compound is a bis-urea of the formula

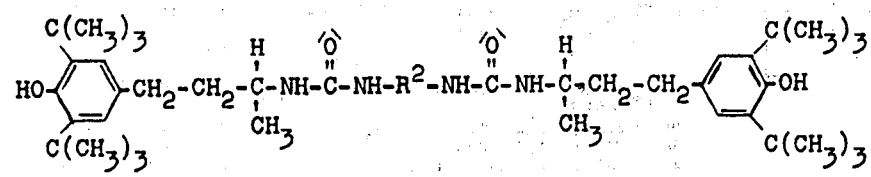

wherein $R^2$ denotes an alkylene group,

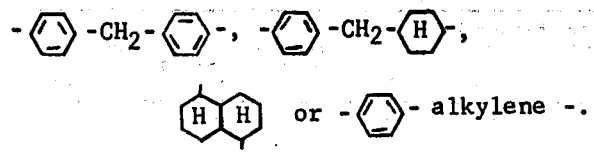 

5. A process as claimed in claim 1 wherein $R^2$ denotes an alkylene group,

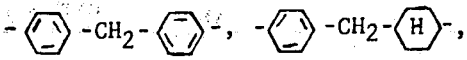

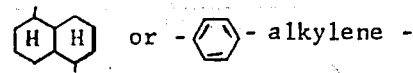

and in which $R^3$ denotes an alkylene group or a phenylene group or

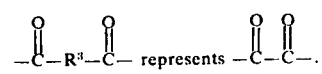

6. A process as claimed in claim 1 wherein said polyamide is a polylactam of pyrrolidone, caprolactam, capryllactam, enantholactam, aminoundecanolactam, lauroyllactam or mixtures therof.

7. A process as claimed in claim 1 wherein said polyamide is a polyamide polycondensate of an aliphatic dicarboxylic acid of 4 to 18 carbon atoms and a diamine of 4 to 18 carbon atoms.

8. A process as claimed in claim 1 wherein said polyamide is nylon-6,6 or nylon-6,10.

9. A process for stabilizing polyamides against oxidation and thermal degradation, which comprises adding thereto a stabilizing compound of the formula:

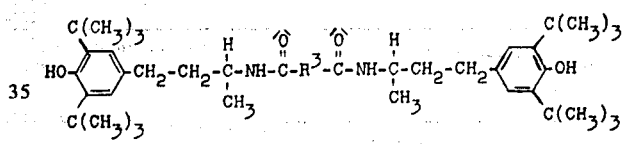

in which $R^3$ denotes an alkylene group or a phenylene group or

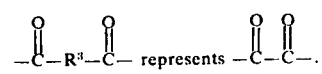

10. A process as claimed in claim 9, wherein the stabilizer compound is used in amounts of from 0.01 to 2% by weight of the polyamide.

* * * * *

UNITED STATES PATENT OFFICE
CERTIFICATE OF CORRECTION

PATENT NO. : 3,935,161
DATED : January 27, 1976
INVENTOR(S) : SCHLICHTING et al

It is certified that error appears in the above-identified patent and that said Letters Patent are hereby corrected as shown below:

In Column 7, the 4th formula in Table 1, delete " 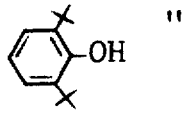 "

In Column 7, the 5th formula in Table 1, should read

--... 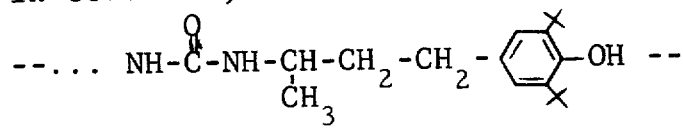 --

In Column 9, the 2nd formula in Table 1, delete

"... 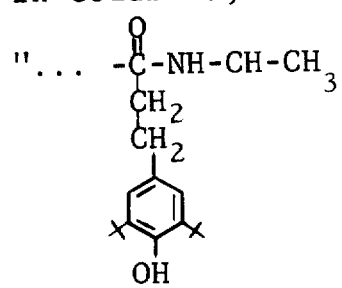 " and substitute --... 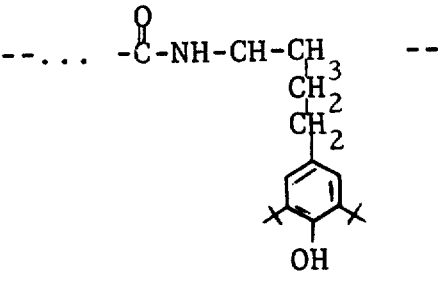 --

Signed and Sealed this

Sixteenth Day of November 1976

[SEAL]

Attest:

RUTH C. MASON
Attesting Officer

C. MARSHALL DANN
Commissioner of Patents and Trademarks